M. WENZOWITZ.
TIRE CHAIN.
APPLICATION FILED OCT. 17, 1921.
1,414,848.
Patented May 2, 1922.
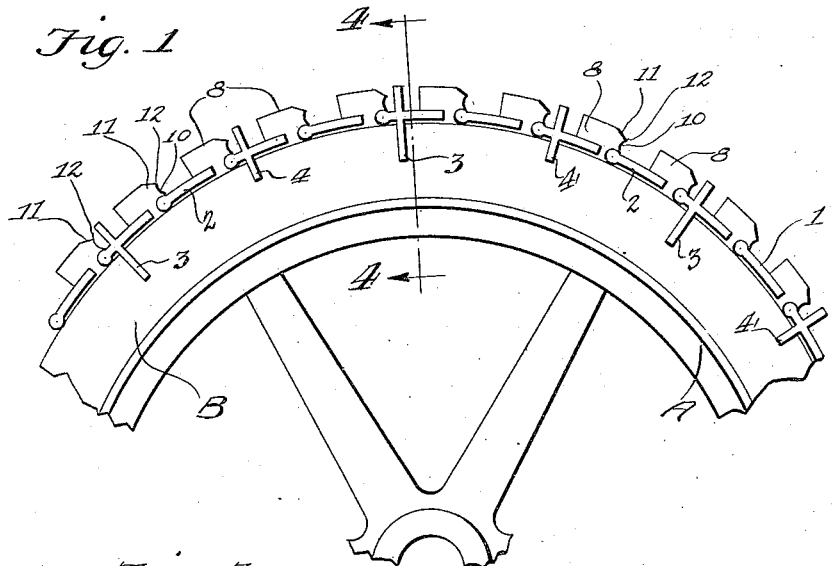
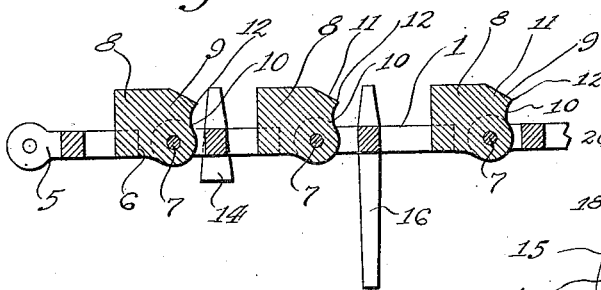
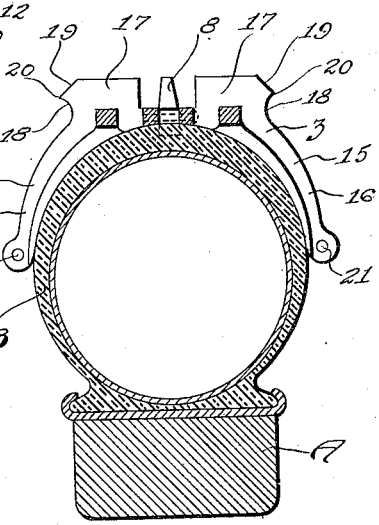
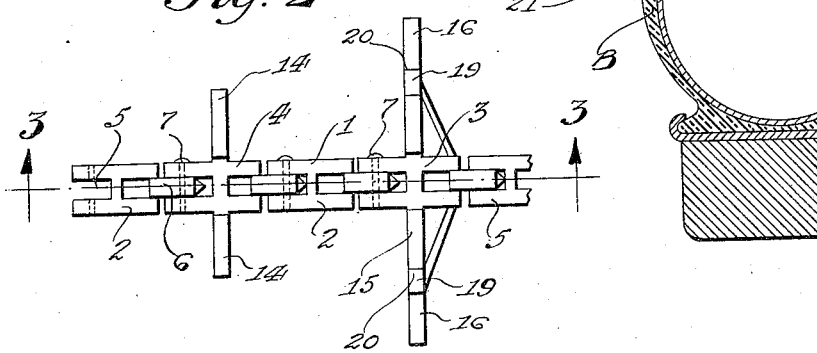
M Wenzowitz
INVENTOR
BY Victor J. Evans
ATTORNEY

UNITED STATES PATENT OFFICE.

MICHAEL WENZOWITZ, OF CHICAGO, ILLINOIS.

TIRE CHAIN.

1,414,848. Specification of Letters Patent. Patented May 2, 1922.

Application filed October 17, 1921. Serial No. 508,116.

*To all whom it may concern:*

Be it known that I, MICHAEL WENZOWITZ, a citizen of Republic of Poland, with declaration of intention to become a citizen of the United States of America, residing at Chicago, in the county of Cook and State of Illinois, have invented new and useful Improvements in Tire Chains, of which the following is a specification.

This invention relates to tire chains for use upon motor vehicle wheels and an object of the invention is to provide a tire chain which will prevent skidding of the vehicle upon which the chain is mounted, and further to provide a chain which may be easily and conveniently mounted about the tread portion of a vehicle wheel and one which is designed to fit the tire tightly so as to eliminate the undesirable noise often occasioned by a loose chain striking the fenders of the vehicle upon which it is mounted.

Another object of this invention is to provide a chain as specified which is composed of a plurality of detachable connected links anyone of which may be replaced with a minimum amount of labor when it becomes worn and without necessitating change of the entire chain.

Another object of this invention is to provide an antiskid tire chain as specified which comprises a plurality of circumferentially and transversely extending radial projections which will prevent both circumferential and transverse skidding of the tire upon which the chain is mounted and which will also cause the chain to hold the vehicle on brick, stone, asphalt, sand or wooden pavements without fear of skidding.

Other objects of the invention will appear in the following detailed description taken in connection with the accompanying drawing wherein:

Fig. 1 is a fragmentary side elevation of a tire showing the improved chain mounted thereon.

Fig. 2 is a fragmentary top plan of the chain.

Fig. 3 is a longitudinal section taken on the line 3—3 of Fig. 2.

Fig. 4 is a cross section taken on the line 4—4 of Fig. 1.

Referring more particularly to the drawings, the improved tire chain 1 is composed of a plurality of links namely three distinctive kinds of links which will be hereinafter referred to as the connecting links 2 full armored links 3 and semiarmored links 4. All of the links are provided with forked ends as shown at 5 which receive there between the single ends 6 of the link next thereto. The said ends being pivotally connected by means of connecting pins 7 which assemble the links in chain formation.

The single ends 6 of the links 2, 3 and 4 are enlarged providing outwardly extending lugs 8 which are spaced circumferentially about the chain structure and run or extend longitudinally along the circumference of the chain providing lugs to prevent lateral skidding of the wheel A upon which the device is mounted. The ends 9 of the lugs 8 are concavely curved as shown at 10 and beveled as at 11 providing relatively sharp points 12 for biting into the surfaces over which the vehicle is traveling and facilitating the travel of the vehicle through mud or the like and which prevents circumferential skidding or spinning or the wheel upon which the chain is mounted. The links 4 have laterally projecting lugs 14 formed thereon intermediate their ends, which lugs are curved transversely and fit tightly about the circumference of the tire B upon which the chain is mounted. The links 3 have lugs 15 formed thereon which include curved tire engaging portions 16 which extend transversely of the tire B and which have lugs 17 formed thereon about the tread portions of the tire, the said lugs presenting flat surfaces towards the ends of the lugs 8 which flat surfaces extends transversely to the flat surfaces of the lugs 8 and which projecting lugs are similar to the lugs on the projection 14 for preventing circumferential skidding of the wheel upon which the chain is mounted. The outer edges or ends of the lugs 17 are shaped like the ends 9 of the lugs 8 that is they are concavely cut as shown at 18 and beveled as shown at 19 providing points 20 which will bite into any soft material over which the wheel is mounting and co-operate with the lugs 8 in preventing transverse skidding of the vehicle wheel. The tire engaging portions 16 are provided with openings 21 at their inner ends to which links (not shown) may be connected for permitting connection with side chains if it is found that side chains are necessary.

From the foregoing description taken in connection with the accompanying drawing it will be apparent that an antiskid chain for vehicle tires has been provided which will practically meet every requirement of antiskid tires and one which may be easily and cheaply manufactured, replaced and handled.

It is, of course, to be understood that the invention may be constructed in various other manners, and the parts associated in different relations, and therefore I do not desire to be limited in any manner except as set forth in the claims hereunto appended.

Having thus described my invention what I claim is:

1. In an antiskid chain, a plurality of connecting links, a plurality of armored links having lugs formed thereon and extending transversely to the links, said links having their outer edges concavely curved and beveled providing sharp edges intermediate the outer and inner edges of the lugs.

2. In an antiskid chain, a plurality of connecting links, a plurality of armored links having lugs formed thereon and extending transversely to the links, said links having their outer edges concavely curved and beveled providing sharp edges intermediate the outer and inner edges of the lugs, said connecting links and armored links having projections formed thereon extending longitudinally of the links and providing outwardly formed projecting lugs for preventing transversed skidding of the wheel equipped with the chain.

3. In an antiskid chain, a plurality of connecting links, a plurality of armored links having lugs formed thereon and extending transversely to the links, said links having their outer edges concavely curved and beveled providing sharp edges intermediate the outer and inner edges of the lugs, said connecting links and armored links having projections formed thereon extending longitudinally of the links and providing outwardly formed projecting lugs for preventing transversed skidding of the wheel equipped with the chain, said last named lugs having certain of their ends concavely curved and beveled to provide sharp edges intermediate the links and the outer edges of the lugs.

4. In a tire chain, the combination of a plurality of connecting links and armored links interposed between each adjacent portion of the connecting links, transversely extending tire engaging portions formed upon said armored links, the projections on certain of said armored links being longer than the projections on other of the armored links, and lugs formed on said armored links and connected to said projections, said lugs extending transversely of the chain and presenting flat surfaces to the direction of travel of a tire equipped with the chain to prevent circumferential skidding of the tire.

5. In a tire chain, the combination of a plurality of connecting links and armored links interposed between each adjacent portion of the connecting links, transversely extending tire engaging portions formed upon said armored links, the projections on certain of said armored links being longer than the projections on other of the armored links, and lugs formed on said armored links and connected to said projections, said lugs extending transversely of the chain and presenting flat surfaces to the direction of travel of a tire equipped with the chain to prevent circumferential skidding of the tire, and lugs formed upon all of said links and projecting outwardly therefrom and extending longitudinally of the links, said last named lugs presenting flat surface to prevent transversed skidding of the tire upon which the chain is mounted.

In testimony whereof I affix my signature.

MICHAEL WENZOWITZ.